(12) United States Patent
Sela et al.

(10) Patent No.: US 9,021,187 B2
(45) Date of Patent: Apr. 28, 2015

(54) LOGICAL BLOCK ADDRESS REMAPPING

(71) Applicants: Rotem Sela, Haifa (IL); Aviad Zer, Kfar Vradim (IL)

(72) Inventors: Rotem Sela, Haifa (IL); Aviad Zer, Kfar Vradim (IL)

(73) Assignee: SanDisk Technologies Inc., Plano, TX (US)

(*) Notice: Subject to any disclaimer, the term of this patent is extended or adjusted under 35 U.S.C. 154(b) by 275 days.

(21) Appl. No.: 13/753,144

(22) Filed: Jan. 29, 2013

(65) Prior Publication Data

US 2014/0215125 A1    Jul. 31, 2014

(51) Int. Cl.
*G06F 12/02* (2006.01)

(52) U.S. Cl.
CPC ........ *G06F 12/0246* (2013.01); *G06F 12/0253* (2013.01); *G06F 2212/7201* (2013.01); *G06F 12/0292* (2013.01)

(58) Field of Classification Search
CPC ............ G06F 12/0246; G06F 12/0253; G06F 12/0646; G06F 12/1009; G06F 12/0292; G06F 2212/1024; G06F 2212/1044; G06F 2212/214; G06F 2212/7201
See application file for complete search history.

(56) References Cited

U.S. PATENT DOCUMENTS

| | | |
|---|---|---|
| 2008/0307192 A1 | 12/2008 | Sinclair et al. |
| 2009/0055620 A1 | 2/2009 | Feldman et al. |
| 2010/0312983 A1 | 12/2010 | Moon et al. |
| 2011/0119455 A1 | 5/2011 | Tsai et al. |
| 2013/0268718 A1* | 10/2013 | Hall ............................. 711/103 |
| 2014/0173178 A1* | 6/2014 | Schwartz ...................... 711/103 |

* cited by examiner

*Primary Examiner* — Hal Schnee
(74) *Attorney, Agent, or Firm* — Brinks Gilson & Lione

(57) ABSTRACT

A method and system is disclosed that remaps logical block addresses (LBAs) for defragmentation that is managed at the storage device level. The remapping may include sequentially remapping LBAs where individual files are remapped so that each file is referenced by sequential LBAs. The remapping of LBAs may be performed without changes to the physical location of data.

22 Claims, 5 Drawing Sheets

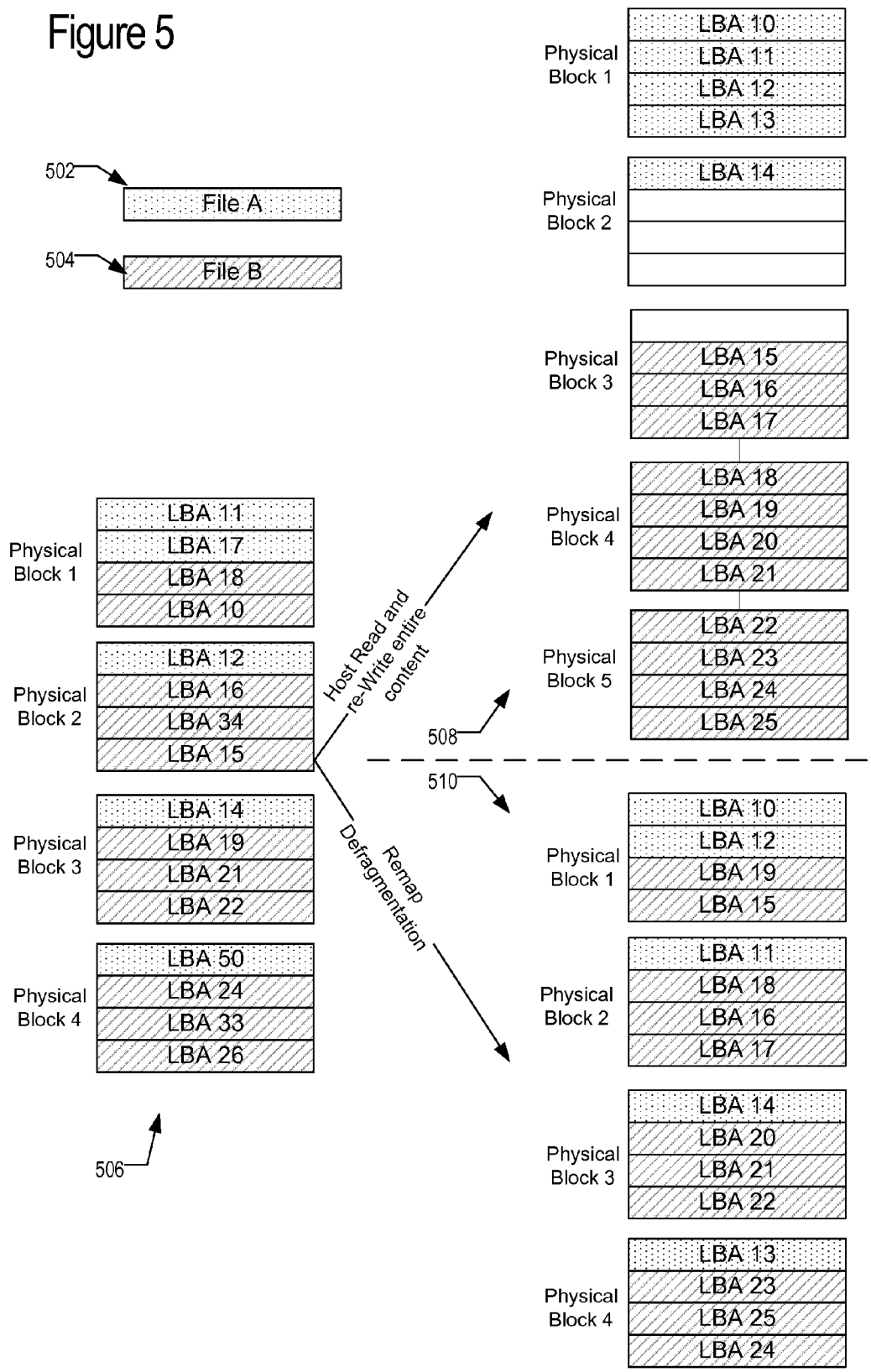

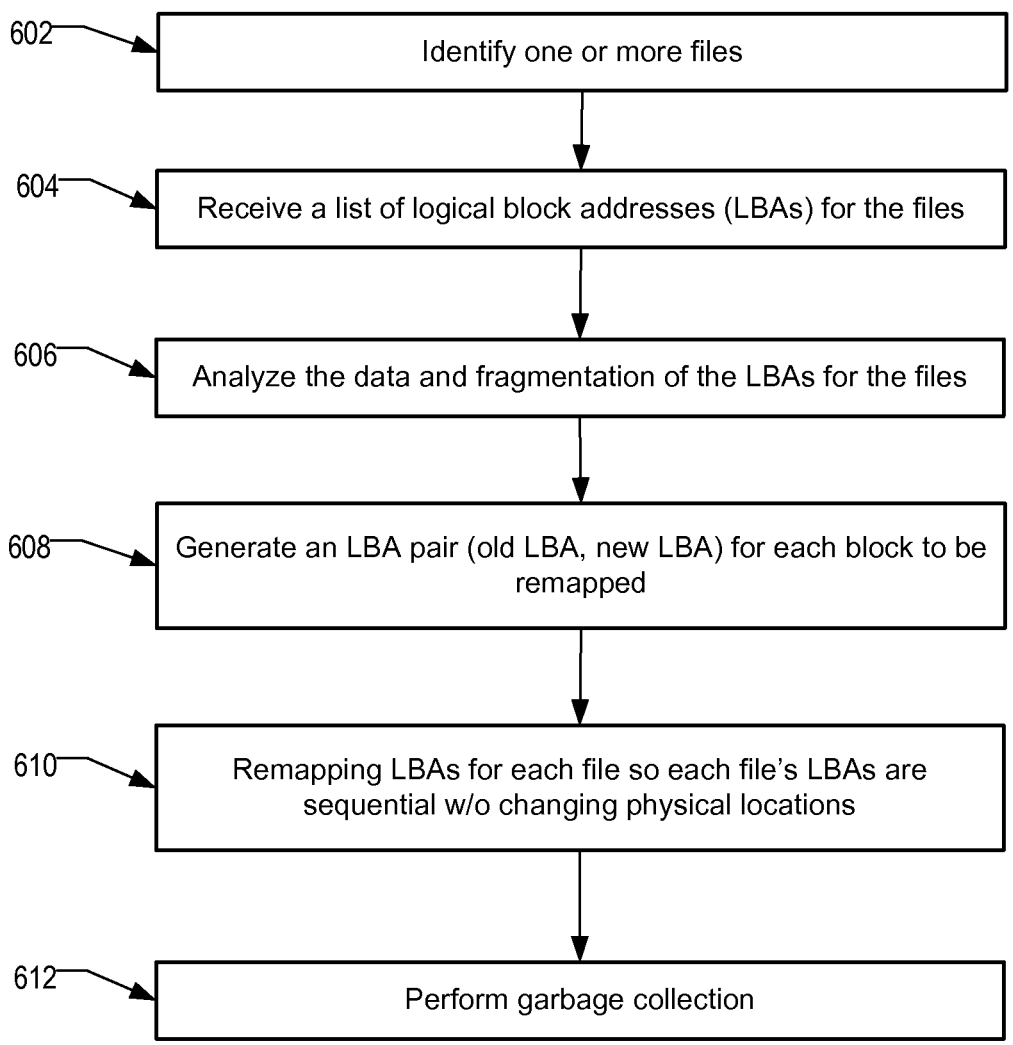

LOGICAL BLOCK ADDRESS REMAPPING

TECHNICAL FIELD

This application relates generally to memory devices. More specifically, this application relates to sequentially remapping logical block addresses in reprogrammable non-volatile semiconductor flash memory.

BACKGROUND

Non-volatile memory systems, such as flash memory, have been widely adopted for use in consumer products. Flash memory may be found in different forms, for example in the form of a portable memory card that can be carried between host devices or as a solid state disk (SSD) embedded in a host device. When writing data to a conventional flash memory system, a host typically writes data to, and reads data from, addresses within a logical address space of the memory system. The memory system then commonly maps data between the logical address space (e.g. a logical block address (LBA)) and the physical blocks or metablocks of the memory, where data is stored in fixed logical groups corresponding to ranges in the logical address space. The host keeps track of the LBAs of its data files within the logical address space and the memory system may operate without knowledge of this mapping.

A drawback of memory systems that operate in a logical address space is fragmentation. Data written by a host file system may often be fragmented in logical address space, where many fixed logical groups are only partially updated with new data. The fragmentation may occur as a result of cumulative fragmentation of free space by the host file system, and possibly even as a result of inherent fragmentation of individual files by the host file system. When a memory device is fully fragmented, in order to improve performance the host may need to perform disk defragmentation in which the host reads the disk and re-writes each file in a sequential manner. The performance of a memory system may be degraded by increased fragmentation and frequent disk defragmentation. Disk defragmentation may be a long process that results in flash wear out and requires significant time/resources. Accordingly, hosts may refrain from performing defragmentation to avoid poor performance. Software solutions to more efficient defragmentation may occur at the file system level when a user schedules a time which the defragmentation software would run.

SUMMARY

Defragmentation that is managed at the storage device level may be more efficient and require fewer resources than software solutions at the file system level. The device performs a remap, which may be a faster operation than the host reading and re-writing the data as part of a full defragmentation. The remapping may include sequentially remapping logical block addresses (LBAs). Individual files may be remapped so that each file is referenced by sequential LBAs. The remapping of LBAs may be performed without changes to the physical location of data.

BRIEF DESCRIPTION OF THE DRAWINGS

FIG. 5 is an illustration of remapping logical block addresses.

FIG. 6 is a flow chart illustrating a remapping process.

DESCRIPTION OF THE PRESENTLY PREFERRED EMBODIMENTS

Figure 1:
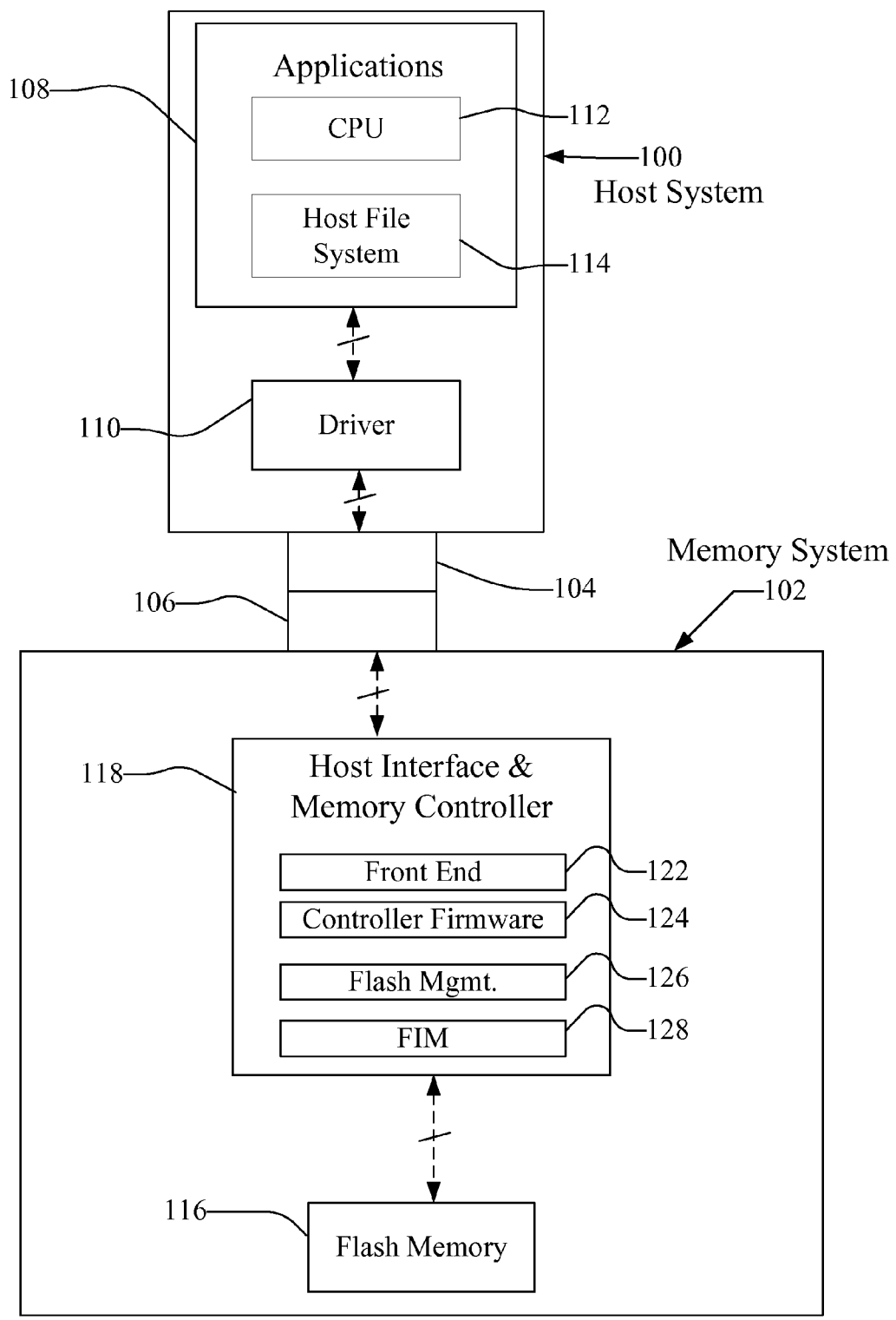
FIG. 1 is a block diagram of a host connected with a memory system having non-volatile memory.
Figure 2:
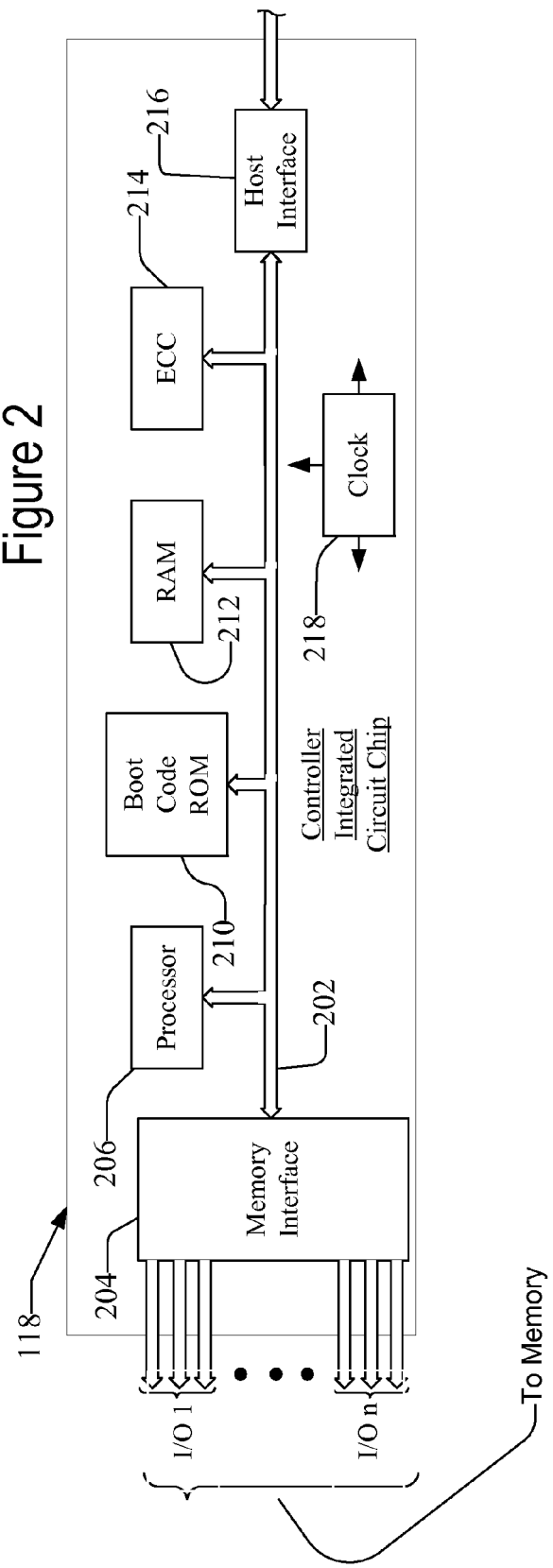
FIG. 2 is a block diagram of an exemplary flash memory system controller for use in the system of FIG. 1.

A flash memory system suitable for use in implementing aspects of the invention is shown in FIGS. 1-2. A host system 100 of FIG. 1 stores data into and retrieves data from a flash memory 102. The flash memory may be embedded within the host, such as in the form of a solid state disk (SSD) drive installed in a personal computer. Alternatively, the memory 102 may be in the form of a flash memory card that is removably connected to the host through mating parts 104 and 106 of a mechanical and electrical connector as illustrated in FIG. 1. A flash memory configured for use as an internal or embedded SSD drive may look similar to the schematic of FIG. 1, with one difference being the location of the memory system 102 internal to the host. SSD drives may be in the form of discrete modules that are drop-in replacements for rotating magnetic disk drives.

Examples of commercially available removable flash memory cards include the CompactFlash (CF), the MultiMediaCard (MMC), Secure Digital (SD), miniSD, Memory Stick, SmartMedia, TransFlash, and microSD cards. Although each of these cards may have a unique mechanical and/or electrical interface according to its standardized specifications, the flash memory system included in each may be similar. These cards are all available from SanDisk Corporation, assignee of the present application. SanDisk also provides a line of flash drives under its Cruzer trademark, which are hand held memory systems in small packages that have a Universal Serial Bus (USB) plug for connecting with a host by plugging into the host's USB receptacle. Each of these memory cards and flash drives includes controllers that interface with the host and control operation of the flash memory within them.

Host systems that may use SSDs, memory cards and flash drives are many and varied. They include personal computers (PCs), such as desktop or laptop and other portable computers, tablet computers, cellular telephones, smartphones, personal digital assistants (PDAs), digital still cameras, digital movie cameras, and portable media players. For portable memory card applications, a host may include a built-in receptacle for one or more types of memory cards or flash drives, or a host may require adapters into which a memory card is plugged. The memory system may include its own memory controller and drivers but there may also be some memory-only systems that are instead controlled by software executed by the host to which the memory is connected. In some memory systems containing the controller, especially those embedded within a host, the memory, controller and drivers are often formed on a single integrated circuit chip.

The host system 100 of FIG. 1 may be viewed as having two major parts, insofar as the memory 102 is concerned, made up of a combination of circuitry and software. They are an applications portion 108 and a driver portion 110 that interfaces with the memory 102. There may be a central processing unit (CPU) 112 implemented in circuitry and a host file system 114 implemented in hardware. In a PC, for example, the applications portion 108 may include a processor 112 running word processing, graphics, control or other popular application software. In a camera, cellular telephone or other host system 114 that is primarily dedicated to performing a single set of functions, the applications portion 108 includes the software that operates the camera to take and store pictures, the cellular telephone to make and receive calls, and the like.

The host system 100 may be referred to as a front end, while the flash memory 116 may be referred to as a back end. The controller 118 interfaces with both the front end (host 100) and the back end (memory 116).

The memory system 102 of FIG. 1 may include non-volatile memory, such as flash memory 116, and a system controller 118 that both interfaces with the host 100 to which the memory system 102 is connected for passing data back and forth and controls the memory 116. The system controller 118 may convert between logical addresses of data used by the host 100 and physical addresses of the flash memory 116 during data programming and reading. Functionally, the system controller 118 may include a front end 122 that interfaces with the host system, controller logic 124 for coordinating operation of the memory 116, and flash management logic 126 for internal memory management operations. There may also be one or more flash interface modules (FIMs) 128 or memory interfaces to provide a communication interface between the controller with the flash memory 116.

The system controller 118 may be implemented on a single integrated circuit chip, such as an application specific integrated circuit (ASIC) such as shown in FIG. 2. The processor 206 of the system controller 118 may be configured as a multi-thread processor capable of communicating via a memory interface 204 having I/O ports for each memory bank in the flash memory 116. The system controller 118 may include an internal clock 218. The processor 206 communicates with an error correction code (ECC) module 214, a RAM buffer 212, a host interface 216, and boot code ROM 210 via an internal data bus 202. The RAM 212 may be a static random-access memory ("SRAM") in which a compaction bitmap is stored. The bitmap may be generated and stored in SRAM and may be discarded after it is used for transferring data from a source block to a destination block. The ROM 210 may be used to initialize a memory system 102, such as a flash memory device. The memory system 102 that is initialized may be referred to as a card. The host interface 216 may provide the data connection with the host.

Figure 3:
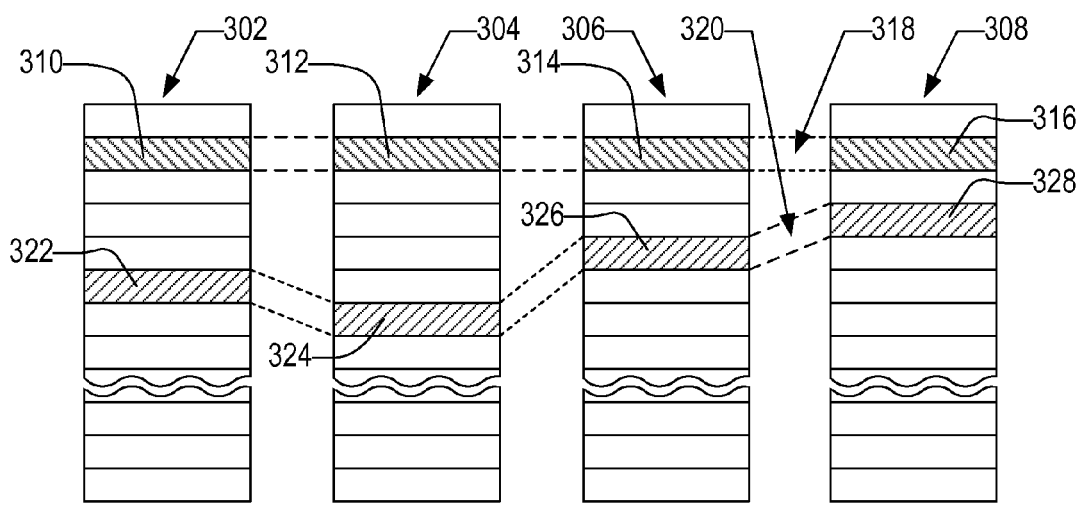
FIG. 3 illustrates an example physical memory organization of the system of FIG. 1.

FIG. 3 conceptually illustrates an organization of the flash memory cell array 112 (FIG. 1). The flash memory cell array 112 may include multiple memory cell arrays which are each separately controlled by a single or multiple memory controllers 114. Four planes or sub-arrays 302, 304, 306, and 308 of memory cells may be on a single integrated memory cell chip, on two chips (two of the planes on each chip) or on four separate chips. The specific arrangement is not important to the discussion below. Other numbers of planes, such as 1, 2, 8, 16 or more may exist in a system. The planes are individually divided into groups of memory cells that may form the minimum unit of erase, hereinafter referred to as blocks. Blocks of memory cells are shown in FIG. 3 by rectangles, such as blocks 310, 312, 314, and 316, located in respective planes 302, 304, 306, and 308. There can be any number of blocks in each plane. As discussed below, the physical locations of the memory blocks may be identified by a mapping, such as the logical to physical mapping and each block may be identified by a logical block address (LBA).

As mentioned above, the block of memory cells is the unit of erase, the smallest number of memory cells that are physically erasable together. For increased parallelism, however, the blocks are operated in larger metablock units. One block from each plane is logically linked together to form a metablock. The four blocks 310, 312, 314, and 316 are shown to form one metablock 318. All of the cells within a metablock may be erased together. The blocks used to form a metablock need not be restricted to the same relative locations within their respective planes, as is shown in a second metablock 320 made up of blocks 322, 324, 326, and 328. Although it is usually preferable to extend the metablocks across all of the planes, for high system performance, the memory system can be operated with the ability to dynamically form metablocks of any or all of one, two or three blocks in different planes. This allows the size of the metablock to be more closely matched with the amount of data available for storage in one programming operation.

Figure 4:
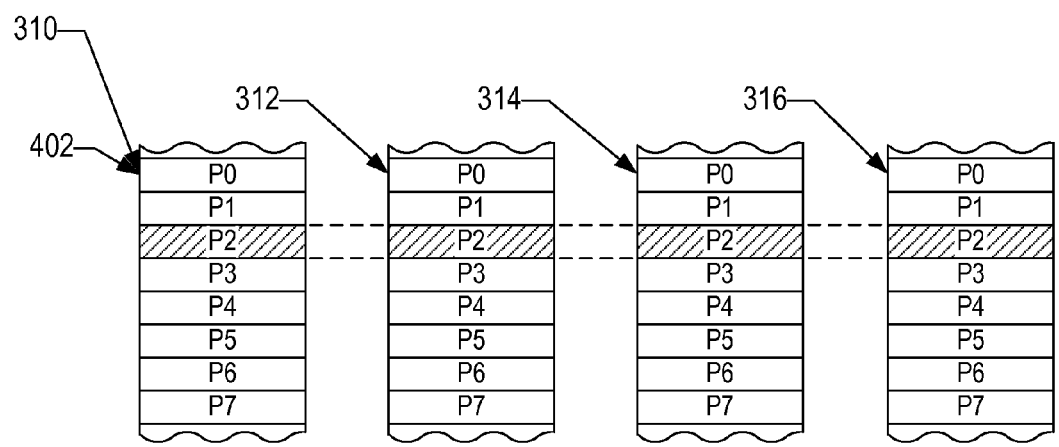
FIG. 4 shows an expanded view of a portion of the physical memory of FIG. 3.

The individual blocks are in turn divided for operational purposes into pages of memory cells, as illustrated in FIG. 4. FIG. 4 shows an expanded view of a portion of the physical memory of FIG. 3. The memory cells of each of the blocks 310, 312, 314, and 316, for example, are each divided into eight pages P0-P7. Alternatively, there may be 16, 32 or more pages of memory cells within each block. The page is the unit of data programming and reading within a block, containing the minimum amount of data that are programmed or read at one time. However, in order to increase the memory system operational parallelism, such pages within two or more blocks may be logically linked into metapages. A metapage 402 is illustrated in FIG. 4, being formed of one physical page from each of the four blocks 310, 312, 314, and 316. The metapage 402, for example, includes the page P2 in each of the four blocks but the pages of a metapage need not necessarily have the same relative position within each of the blocks. The mapping including the LBAs may refer to metapages.

Instead of reading data out of the storage device and writing it sequentially in a new location (LBA), the host may use the remapping described herein. This remapping may be provided by the storage device. The host sends a list of LBA pairs (Current LBA, New LBA) through the storage device. The LBA pair may identify a particular LBA (Current LBA) and the LBA that it is remapped to (New LBA). The LBA pair may further identify a range of blocks that are remapped (Range of current LBA, Range of new LBA). In other words, the "pair" may be more than just a pair of blocks when it identifies the current and new mapping for more than one block. The memory device re-maps the current LBA to the new LBA without actually copying the data or changing the physical location of that data.

In a back end system which maps a physical block to several discontinuous LBA addresses and performs optimizations over this table, remapping may be an efficient process that does not require significant processing. Full defragmentation may result in sequential or continuous LBA addresses, but it also requires changes to the physical locations of the data. In full defragmentation (in which the host reads all data and rewrites that data) the data is stored sequentially in the physical memory. The remapping changes the LBA table, so that individual files have sequential or continuous LBA addresses for each file. However, the remapping does not result in the data being stored sequentially in the physical memory. FIG. 5 illustrates the differences between the remapping and a full defragmentation.

FIG. 5 is an illustration of remapping logical block addresses. FIG. 5 illustrates the remapping of four physical blocks in a fragmented state 506. The blocks in the fragmented state 506 store data from two files: File A 502 and File B 504. Each of the four physical blocks includes a mix of data from File A and File B. For example, physical block 1 includes LBA 11 and LBA 17 from File A and includes LBA 18 and LBA 10 from File B.

A full defragmentation is illustrated in the full defragmentation state 508. As shown with the full defragmentation state 508, the two files are not only remapped so that the LBAs for each file are sequential, but the physical locations of the data are copied so that the physical storage of the blocks is sequential. Accordingly, the full defragmentation state 508 illustrates File A being stored as LBA 10-14 in Physical Blocks 1-2 and File B being stored as LBA 15-25 in Physical Blocks 3-5. This full defragmentation may require significant time and resources to read and re-write all the blocks to sequential physical blocks.

The remapping is illustrated in the remapping state 510 and may be referred to as remap defragmentation. The remapping state 510 remaps the LBAs so that the LBAs for individual files are sequential without changing the physical locations. Accordingly, the remapping state 510 is identical to the fragmented state except the LBAs have been remapped. In particular, File A is remapped to LBA 10-14, while File B is remapped to LBA 15-25. In alternative embodiments, the range of the LBAs for the Files may be different (for example starting at LBA 01), but should be sequential. The LBAs between different files does not need to be continuous as long as the LBAs for each file are sequential. In other words, File B could be remapped to LBA 16-26 (rather than LBA 15-25) or any other range that does not overlap with already used LBAs as long as File B is remapped to sequential LBAs.

The remapping shown in FIG. 5 may be generated based on LBA pairs that map from a current LBA to a new LBA. The remapping may be developed by the host and implemented by the storage device. In other words, the host may select the LBA pairs. For the example in FIG. 5 the LBA remapping for File A is shown in Table 1:

TABLE 1

Remapping Pairs For File A

| Current LBA | New LBA |
|---|---|
| 11 | 10 |
| 17 | 12 |
| 12 | 11 |
| 16 | 18 |
| 14 | 16 |
| 50 | 13 |

Table 2 illustrates the remapping of File B:

TABLE 2

Remapping Pairs For File B

| Current LBA | New LBA |
|---|---|
| 18 | 19 |
| 10 | 15 |
| 16 | 18 |
| 34 | 16 |
| 15 | 17 |
| 19 | 20 |
| 24 | 23 |
| 33 | 25 |
| 26 | 24 |

The generation of the remapping pairs is used to remap a fragmented file into a continuous and sequential LBAs for all blocks in the file. As described, the logical addresses are remapped while the physical location of the blocks is not changed. The blocks may remain fragmented in the physical memory after remapping, but the logical addresses (LBAs) are not fragmented and are sequential for each file.

FIG. 6 is a flow chart illustrating a remapping process. In particular, FIG. 6 further illustrates the remapping operation described with respect to FIG. 5. In block 602, files are identified including the memory blocks or data that make up that file. In block 604, a list of those memory blocks is retrieved and includes all the LBAs that map to the physical location of the blocks/data that make up the file. In block 606, the files and their blocks/data is analyzed to identify defragmentation of the logical address space for each file. Based on this analysis, an LBA pair is generated for each block to be remapped as in block 608. In particular, in order to remap a particular file into continuous/sequential logical addresses, some of the old LBAs may be remapped into new LBAs. The LBA pair may merely be (Old LBA, New LBA) for each block or other unit of data that is to be remapped. In block 610, the old LBAs are remapped so that each file has sequential LBAs without changing the physical location for the blocks.

In block 612, another operation may be performed on the remapped data, such as garbage collection. Garbage collection is merely one example, of an operation that is improved because the blocks for each file are logically addressed sequentially. In particular, sequential logical addresses may improve the speed of garbage collection operations. In particular, the sequential logical addresses may allow the file to be accessed in a single read command (i.e. sequential read) rather than multiple reads if the logical addresses for a file were not continuous or sequential. The garbage collection operation will require fewer operations and commands (e.g. fewer reads) when the files are sequential addressed in the logical space. In particular, if a file is sequential on the LBA side, the garbage collection could make it sequential on the physical side. Accordingly, the remapping followed by garbage collection may result in the file being sequential on the logical side of the LBA address and on the physical side of the flash blocks. The garbage collection may be performed as a background operation after the remapping.

The remapping may improve a number of times that the device performs garbage collection. The device may eventually (through background operations) update the physical blocks of data to the LBA so that the files may be sequential at the physical level. It may also increase the write command performance since the data would be placed in a complete physical block. In addition, the host may not have to issue many read or write commands to access a single file, and it may be able to use a single command. In addition, the amount of blocks which are partially programmed may be minimized which may help flash management by reducing the size of the management tables and seek times. In addition, the "write amplification factor" which is the amount of data a flash controller has to write in relation to the amount of data that the host controller wants to write (due to any internal copying of data from one block to another block) would decrease.

In one embodiment, the device may inform the host of a minimum granularity for the remapping process described herein. The minimum granularity may be the smallest size of data for which the remap process is triggered. For example, each LBA may be a byte or sector (e.g. 512 bytes or 4 kilobytes), and the remap may be set for a minimum number of LBAs, such as ten sectors, in one example. The host may not do a remap for each sector, and may remap only for the minimum amount of sectors. This may reduce the number of LBAs in the logical to physical table. This minimum size or minimum granularity may be part of an existing command or may be a new command by the device to the host.

In alternative embodiments, only the host may know about files and the identification. There may be an indication of files that is then used by the device for separating files into physical blocks. The device may reorder LBAs based on a sequence without knowledge of the files, but the file indication may be used for storing in physical blocks. A defragmentation process may occur whenever a file is deleted. The deletion of a file may trigger the host to defragment the files. This defragmentation may result in all files being contiguously stored. Likewise, there may be other triggers for defragmentation.

A "computer-readable medium," "machine readable medium," "propagated-signal" medium, and/or "signal-bearing medium" may comprise any device that includes, stores, communicates, propagates, or transports software for use by or in connection with an instruction executable system, apparatus, or device. The machine-readable medium may selectively be, but not limited to, an electronic, magnetic, optical, electromagnetic, infrared, or semiconductor system, apparatus, device, or propagation medium. A non-exhaustive list of examples of a machine-readable medium would include: an electrical connection "electronic" having one or more wires, a portable magnetic or optical disk, a volatile memory such as a Random Access Memory "RAM", a Read-Only Memory "ROM", an Erasable Programmable Read-Only Memory (EPROM or Flash memory), or an optical fiber. A machine-readable medium may also include a tangible medium upon which software is printed, as the software may be electronically stored as an image or in another format (e.g., through an optical scan), then compiled, and/or interpreted or otherwise processed. The processed medium may then be stored in a computer and/or machine memory.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

We claim:

1. A method for remapping in a memory system having blocks stored in non-volatile storage and a controller in communication with the non-volatile storage, the method comprising:

determining an indication of a minimum size of data stored in fragmented blocks that each have a logical block address (LBA); and receiving, based on the minimum size, a mapping of the LBA for each of the fragmented blocks so LBAs for each of one or more files are sequential; and remapping the LBAs without changing physical addresses of data associated with the LBAs.

2. The method of claim 1 wherein the receiving is by the controller from a host.

3. The method of claim 2 wherein the received mapping comprises an LBA pair for each LBA to be remapped, wherein each LBA pair comprises a current LBA to be remapped and a new LBA that the current LBA is mapped to.

4. The method of claim 1 wherein the determining the indication is by another module in the memory system which is responsible for managing a file system.

5. The method of claim 4 wherein the memory system can power-up after remapping so that a host can read a new updated logical to physical address table based on the received mapping.

6. The method of claim 1 wherein the memory comprising non-volatile storage includes a flash memory or a solid state memory.

7. The method of claim 1 further comprising:

performing a garbage collection operation after the remapping, wherein a number of garbage collection read commands are minimized because each of the one or more files includes sequential LBAs.

8. The method of claim 7 wherein the garbage collection operation physically aggregates data on physical blocks according to the sequential LBAs from the remapping.

9. The method of claim 1 further comprising:

receiving a command from a host to perform physical aggregation of data on physical blocks according to the sequential LBAs from the remapping.

10. A memory system comprising:

a non-volatile storage having an array of memory blocks storing data that is associated with logical block addresses (LBAs); and a controller in communication with the blocks, the controller configured to:

determine an indication of fragmented data that comprises one or more files, wherein the one or more files are stored in the memory blocks and are fragmented based on their LBAs, wherein the indication includes a minimum size of the fragmented data;

receive a list of LBA pairs that provides a new LBA for each LBA of the one or more files such that the new LBAs for each of the one or more files are sequential; and remap, in response to the list and based on the minimum size, the LBAs for each of the one or more files to the new LBAs without changing physical addresses of data associated with the LBAs.

11. The memory system of claim 10 wherein the list is provided by a host and the host identifies the one or more files.

12. The memory system of claim 10 wherein the LBA pairs comprises one or more blocks, further wherein the LBA pairs can include a range of blocks.

13. The memory system of claim 10 wherein the fragmented data comprises non-sequential LBAs for each of the one or more files.

14. The memory system of claim 10 wherein each LBA identifies a physical block.

15. The memory system of claim 10 wherein the remap generates a new copy of a logical to physical table, further wherein an old copy of the logical to physical table is stored in case of a power failure during an update.

16. A method for operating a memory system comprising a non-volatile storage device having a controller and blocks of memory, the method comprising:
   receiving a list of logical block address pairs for remapping logical block addresses for files, wherein each of the files comprises data referenced by the logical block addresses; and
   remapping the logical block addresses based on the list of logical block address pairs without changing a physical location of the data referenced by the logical block addresses, wherein the remapping changes the logical block addresses to be sequential for each of the files.

17. The method of claim 16 wherein the remapping changes the logical block addresses to combine each file into sequential blocks.

18. The method of claim 16 wherein the list of logical block address pairs is received from a host.

19. The method of claim 18 wherein the list of logical block address pairs includes a range of values that are remapped.

20. The method of claim 16 wherein each logical block address pair in the list of logical block address pairs comprises an original logical block address and a corresponding new logical block address.

21. The method of claim 20 wherein the remapping comprises remapping each original logical block address to the corresponding new logical block address.

22. The method of claim 16 wherein the remapping occurs after each of the files are deleted.

\* \* \* \* \*